United States Patent Office

2,858,269
Patented Oct. 28, 1958

2,858,269

COAGULATION AND SLUDGE CONDITIONING

John Holley Harwood and John Kerr, Widnes, and Sydney Francis William Crundall, Woolston, Warrington, England, assignors to Peter Spence & Sons Limited, Widnes, England, a British company No Drawing. Application September 10, 1954
Serial No. 455,363

Claims priority, application Great Britain
September 12, 1953

3 Claims. (Cl. 210—42)

This invention relates to coagulation in aqueous media and to the conditioning by coagulation of sewage sludges prior to filtration.

The use of multivalent inorganic salts, particularly salts of trivalent metals such as aluminium, iron and chromium, as coagulating, flocculating or conditioning agents is well known. Thus aluminium sulphate, ferric chloride, chlorinated copperas, and copperas in admixture with lime have been used for many years in the coagulation and rapid settlement of colloidal and suspended solids in sewage. These and other coagulants, particularly aluminium chloride, ferric chloride and chlorinated copperas, are used in the conditioning of sewage sludges prior to removal of part of the water content thereof by filtration. The most economical method of preparation of aluminium chloride for coagulation purposes is by reaction of aluminium sulphate with calcium chloride as described in British patent specification 516,706.

It is known that the presence of anions of high valency in the coagulating agent used is detrimental to its coagulating action. Thus salts containing monovalent anions such as chlorides are preferable to those containing divalent anions such as sulphates.

It has been proposed to obtain improved coagulation by using basic chloride solutions of aluminium or iron, i. e. solutions wherein the numerical ratio of chlorine ions to aluminium or iron ions is lower than in solutions of the corresponding normal salts.

An object of the invention is to provide a coagulation process whereby coagulation is rapidly achieved with considerable saving in the amount of coagulant used. A further object of the invention is to facilitate continuous filtration of the coagulated material.

According to the present invention an improved process for producing coagulation in aqueous media comprises mixing with said media a solution of a highly basic chloride of a trivalent metal, the basicity of said solution, i. e. the proportion of hydroxyl ions to total anions in the chloride being at least 60%.

In a preferred form of the invention, the minimum quantity of basic chloride solution necessary to produce coagulation and calculated as $R_2O_3$ where R is Al, Fe or Cr, amounts to approximately 0.6% of the dry solid content of the aqueous media e. g. a sewage sludge. Quantities greater than the minimum quantity may however be used without deterioration in the filtering characteristics of the sludge. The basic chloride solution may contain approximately 15% $R_2O_3$, but the amount is not critical.

Very basic chlorides of trivalent metals, i. e. those having a basicity of the order of 75% are particularly suitable for efficient coagulation, and it is possible to prepare economically solutions of chlorides corresponding to formulae $R_2Cl_2(OH)_4$ and $R_2Cl(OH)_5$ i. e. having basicities of 66% to 83%. Aluminium chlorohydrate, $Al_2Cl(OH)_5$, is a preferred coagulant.

By using solutions of highly basic chlorides of trivalent metals, the coagulating effect of the trivalent ion may be obtained without the disturbing effect of the divalent sulphate ions common to many coagulants and with a disturbing effect much less than that of the monovalent anions present in the normal chloride.

Aqueous media in which coagulation may be produced according to the process of the invention are, for example, primary sewage sludge, digested primary sludges (such as cold digested primary sludge, mesophilic digested primary sludge, thermophilic digested primary sludge and elutriated digested primary sludges), activated sludge and humus sludge. Coagulation may also be produced in mixtures of these sludges.

The origin and nature of the more important of these sludges will now be briefly discussed.

Sewage entering the sewage works passes through screens which remove relatively large objects, through a grit chamber in which dense suspended matter such as road grit is deposited, and then to a primary sedimentation tank in which finely divided matter separates in the form of a sludge—raw primary sludge. (Coagulants may be used to assist the settlement e. g. aluminoferric or ferric sulphate for efficiency or lime and/or copperas for economy.) The supernatant liquor, containing solids in true and colloidal solution, requires at least one further purification stage before discharge to the river.

If raw primary sludge is allowed to ferment, anaerobically, under conditions such that the temperature does not exceed 80° F., cold digested primary sludge is formed, after a transient stage characterised by the production of acids in the sludge and evolution of a foul smelling digestion gas. After the foul odours of the transient stage disappear, a relatively permanent bacterial flora is established, gas evolution consists largely of carbon dioxide and methane, and the metabolic products of the flora buffer the sludge at pH $7\pm1$.

If raw primary sludge is fermented at 80 to 120° F., a mesophilic digested primary sludge is obtained. Mesophilic digestion results in a more rapid production of gas, but the flora is rather more sensitive to toxic materials and environmental change than is the flora obtained by cold digestion. Similarly, a thermophilic digested primary sludge may be obtained by fermenting raw primary sludge at temperatures greater than 120° F. Any of the aforementioned digested sludges may be elutriated to improve their drainage characteristics.

Activated sludge may be produced as a rather jellylike product by agitating the primary tank effluent with air and adding settled raw primary sludge. The sludge particles become biologically active, tend to coalesce, removing matter in colloidal dispersion, and serve to purify the material present in true solution.

An earlier alternative to activated sludge procedure, as a method for the purification of the primary tank effluent, was the use of contact beds or percolating filters. The impurities contained in the tank effluent serve as the basic food for the biome in the filter. This population produces a considerable amount of waste generally of an insoluble jelly-like nature. After passing through the filters, the liquor is loaded with this waste which is settled out in tanks to form humus sludge and the effluent from the humus tanks is run to river.

The use of highly basic chloride solutions has many advantages compared with conventional coagulating agents:

(a) The interference by the anions with coagulation is reduced. Hence the same amount of coagulation may be produced in a given media with a smaller amount of coagulant. Comparative figures for aluminium chlorohydrate and other coagulants are given below.

| Coagulant | Amount to produce coagulation calculated as percent $R_2O_3$ on dry solids in sludge |
|---|---|
| Aluminium chloride | 1.3 |
| Ferric chloride | 2.0 |
| Chlorinated copperas | 2.5 |
| Aluminium chlorohydrate | 0.57 |

(b) The rate of filtration and sedimentation is improved, the former being illustrated by the following comparison between the rates of filtration of sludge which has been conditioned by different coagulants.

|  | Lbs. dry sludge/ sq. ft. /hour |
|---|---|
| Aluminium chlorohydrate | 6.0 |
| Aluminium chloride | 3.2 |
| Ferric chloride | 3.5 |

(c) The condition of the sludge after coagulation is such that filtration may be carried out continuously for long periods without delays and interruptions due to cloth blinding so often experienced when using conventional coagulants. Thus sludge coagulated according to the invention has been filtered continuously, using vacuum filtration plant, for a period of over 400 hours.

(d) Ease of control is permitted since the amount of basic chloride solution added is not so critical. Unlike conventional conditioning agents, solutions of highly basic chlorides of trivalent metals may be used in large excess (at additional expense) to give yields as high as 9 lbs./sq. ft. per hour.

(e) The corrosion of the equipment used for the process is considerably reduced since the basic chloride solutions produce a smaller change in the pH of the aqueous medium treated, reducing the need for alkali adjustment.

The invention will now be further described and illustrated in the following examples, in which Example 1 illustrates an application of the process on a commercial scale and the remaining examples are comparative tests carried out on a laboratory scale.

*Example 1*

To elutriated digested primary sludge containing 8.0 to 9.0% dry solids, basic aluminium chloride at 67% basicity was added in the form of a solution containing 15.0% $Al_2O_3$ at a rate corresponding to 0.57% $Al_2O_3$ on the content of dry sludge. The mixture was immediately filtered on a rotary vacuum filter. Continuous operation was maintained for a trial period of 290 hours. The yield of dry sludge per square foot per hour was 5.95 lb.

In the following examples, the procedure used was the Buchner funnel test, as used by Wishart, Jepson and Klein (dewatering of sewage sludges by coagulation and vacuum filtration). In all cases, the conditioning produced in the sludge by a given proportion of coagulant is assessed in terms of a filtration rate expressed in one or both of the following functions:

$W$=weight in milligrams of solids filtered per square centimetre of filter paper per minute.
$V$=volume in millilitres of filtrate filtered per square centimetre of filter paper per minute.

The proportion of coagulant used is expressed as a percentage by weight calculated as $R_2O_3$, of the dry solid content of the sludge.

No rigid correlation of test results with plant practice exists but a suggested approximate correlation for 27″ mercury differential pressure across the filter is: Rotary filter yield in lbs./sq. ft./hour=0.04 $W$.

*Example 2*

The test was carried out on raw primary sludge with a solids content of 11.7% using a filter paper No. 1 and a pressure differential of 20″ of mercury. The filter bed area was 63.6 sq. cms. The results are expressed in the following table:

| Coagulating Agent | Percent $R_2O_3$ on Dry Matter | Filtration Rate, W | Filtration, pH |
|---|---|---|---|
| Aluminium Chlorohydrate, 61.7% Basic | 0.0 | 0.6 | 6.2 |
|  | 0.8 | 6 | 6.2 |
|  | 1.5 | 13 | 6.0 |
|  | 2.3 | 16 | 5.6 |
|  | 2.5 | 16 | 5.6 |
|  | 2.6 | 17 | 5.7 |
|  | 3.0 | 20 | 5.2 |
|  | 3.8 | 19 | 4.9 |
|  | 15 | 6 | ---- |
|  | 38 | 6 | 4.3 |
| Ferric Chloride | 1.8 | 3 | 5.2 |
|  | 3.0 | 7 | 4.5 |
|  | 4.2 | 7 | 3.8 |
|  | 6.0 | 6 | 3.0 |

It will be observed that to produce a given filtration rate, a smaller quantity of coagulant is required in the case of aluminium chlorohydrate than in the case of ferric chloride. Moreover, for a given filtration rate or a given quantity of coagulant, the filtrate is less alkaline in the case of aluminium chlorohydrate.

*Example 3*

The test was carried out on raw primary sludge with a solids content of 5.2% the filtration particulars being as in Example 2 (i. e. filter paper, pressure differential and filter bed area). The results were as follows:

| Sludge Age in hours | Agent | Percent $R_2O_3$ on Dry Matter | Filtration Rate, W | Filtrate, pH |
|---|---|---|---|---|
| 26–30 | Aluminium Chlorohydrate, 61.7% Basic. | 0 | 0.4 | 6.1 |
|  |  | 0.9 | 3.8 | 5.4 |
|  |  | 1.0 | 5.9 | 5.4 |
|  |  | 1.3 | 8.4 | 5.3 |
|  |  | 1.7 | 9.6 | 5.3 |
|  |  | 3.5 | 11.9 | 5.1 |
|  |  | 5.2 | 13.8 | 5.0 |
|  |  | 6.9 | 12.1 | 4.9 |
|  |  | 10.4 | 13.8 | 4.7 |
| 72–78 | ---do--- | 5.2 | 9.0 | 4.9 |
|  |  | 6.9 | 9.8 | 4.7 |
|  |  | 8.6 | 9.8 | 4.6 |
|  |  | 12 | 9.4 | 4.5 |
|  |  | 17 | 8.7 | 4.5 |
|  |  | 35 | 4.2 | 4.1 |

It will be observed that variation in the age of the sludge does not effect the filtration rate critically. The results also indicate that little variation in the filtration rate is produced over a considerable range of coagulant amounts, so that the dosage is not critical. Very large excesses of coagulant do however reduce the filtration rate as compared with moderate excesses.

Example 4

The test was carried out on cold digested primary sludge with a solids content of 4.7%, the filtration particulars being as in Example 2. The results were as follows:

| Agent | Percent $R_2O_3$ on Dry Matter | Filtration Rate, W | Filtrate, pH |
|---|---|---|---|
| Aluminium Chlorohydrate, 65.1% Basic. | 2.7 | 8.8 | 7.9 |
|  | 3.5 | 9.6 | 7.8 |
|  | 4.5 | 13 | 7.5 |
|  | 6.6 | 11 | 7.5 |
|  | 11 | 13 | 7.3 |
|  | 18 | 15 | 6.8 |
|  | 44 | 1.8 | 5.4 |
| Ferric chloride | 4.5 | 5.6 | 6.9 |
|  | 7.5 | 8.4 | 6.6 |
|  | 12.0 | 12.2 | 5.9 |
|  | 15 | 14 | 4.8 |
|  | 17 | 12 | 3.2 |
|  | 22 | 7 | 2.6 |

While in this instance, the filtration rates produced using ferric chloride attain a maximum range comparable in magnitude with that using aluminium chlorohydrate, the minimum quantity of coagulant needed to produce a filtration rate in this range (say 11-15) is much less in the case of the chlorohydrate.

Example 5

The test was carried out on mesophilic digested primary sludge using a filter paper No. 1, a filter bed area of 38.6 sq. cms. and a pressure differential of 27" of mercury. The results were as follows:

| Sludge Age | Agent | Percent $R_2O_3$ on Dry Matter | Filtration Rate, W | Filtrate, pH |
|---|---|---|---|---|
| 48 hrs | Aluminium Chlorohydrate, 65% Basic. | 0 | 7.2 | 8.0 |
|  |  | 0.12 | 8.2 | 7.8 |
|  |  | 0.48 | 11.6 | 7.7 |
|  |  | 0.71 | 11.4 | 7.8 |
|  |  | 1.2 | 14 | 7.5 |
|  |  | 1.8 | 18 | 7.5 |
|  |  | 2.4 | 23 | 7.5 |
|  |  | 3.5 | 23 | 7.3 |
|  |  | 5.9 | 24 | 7.1 |
|  |  | 8.3 | 26 | 7.0 |
|  |  | 10 | 32 | 6.8 |
| 48 hrs | Chlorinated Copperas | 5.9 | 8.3 | 7.0 |
|  |  | 8.3 | 15 | 6.8 |
|  |  | 12 | 22 | 5.4 |
|  |  | 24 | 31 | 2.2 |
| 146 hrs | Aluminium Chlorohydrate, 65% basic. | 0 | 7.3 | 7.4 |
|  |  | 0.5 | 10 | 7.3 |
|  |  | 1.0 | 16 | 7.3 |
|  |  | 2.1 | 21 | 7.2 |
|  |  | 5.3 | 23 | 7.2 |
| 166 hrs | do | 0 | 7.7 | 7.6 |
|  |  | 0.5 | 10 | 7.5 |
|  |  | 1.0 | 16 | 7.4 |
|  |  | 2.1 | 21 | 7.3 |
|  |  | 5.2 | 28 | 7.2 |

It will be observed that to produce a filtration rate of the order of 10, the quantity of chlorinated copperas required is very much larger than the quantity of aluminium chlorohydrate. Sludge age does not adversely affect the filtration rate.

Example 6

The test was carried out on elutriated mesophilic digested primary sludge with a solids content of 9.4% using a filter paper No. 1, a filter bed area of 95 sq. cms. and a pressure differential of 20" of mercury. The results were as follows:

| Agent | Percent $R_2O_3$ on Dry Matter | Filtration Rate, W | Filtrate, pH |
|---|---|---|---|
| Aluminium Chlorohydrate, 65% basic. | 0 | 0.7 | 7.8 |
|  | 0.1 | 4.4 | 7.1 |
|  | 0.5 | 36 | 6.9 |
|  | 0.8 | 87 | 6.6 |
|  | 1.0 | 132 | 6.4 |
|  | 1.5 | 149 | 6.2 |
|  | 5.0 | 158 | 5.4 |
| Chromium Chlorohydrate, 75% basic. | 0.5 | 7 | -- |
|  | 0.8 | 49 | 6.8 |
|  | 1.1 | 125 | 6.8 |
|  | 1.5 | 103 | 6.7 |
|  | 1.9 | 183 | -- |
| Ferric Chlorohydrate, 66.7% basic. | 1.0 | 6 | -- |
|  | 1.7 | 17 | -- |
|  | 2.5 | 47 | -- |
|  | 3.4 | 62 | -- |
|  | 5.1 | 108 | -- |

It will be observed that the efficiency of chromium and ferric chlorohydrates as coagulants compares favourably with that of aluminium chlorohydrate, assessed in terms of filtration rate.

Example 7

The test was carried out on elutriated mesophilic digested primary sludge. The elutriation was effected in the laboratory 5 times with tap water using 1 volume of water to 4 volumes of digested sludge. The solids content of the elutriated sludge was 8.12% and the total age 44 hours.

| Agent | Percent $R_2O_3$ on Dry Matter | Filtration Rate, W |
|---|---|---|
| Aluminium chloride | 0.24 | 67 |
|  | 0.6 | 102 |
|  | 0.9 | 102 |
|  | 1.2 | 84 |
| Ferric chloride | 0.4 | 84 |
|  | 0.7 | 84 |
|  | 1.4 | 112 |
| Aluminium chlorohydrate, 82% basic | 0.24 | 112 |
|  | 0.5 | 168 |
|  | 0.6 | 202 |
|  | 1.2 | 144 |

The above figures illustrate the increased effectiveness of aluminium chlorohydrate as a conditioning agent as compared with aluminium and ferric chlorides.

Example 8

The test was carried out on elutriated cold digested primary sludge having a solids content of 6.45% using filter paper No. 1, a pressure differential of 20" of mercury and a filter bed area of 63.6 sq. cms. The sludge was prepared by subjecting cold digested primary sludge to two 1:1 elutriations with tap water. The total sludge age was 60 hours. The results were as follows:

| Agent | Percent $R_2O_3$ on Dry Matter | Filtration Rate, W | Filtrate, pH |
|---|---|---|---|
| Aluminium Chlorohydrate, 65.1% basic. | 0.5 | 17 | 7.7 |
|  | 0.8 | 12 | 7.6 |
|  | 1.3 | 19 | 7.5 |
|  | 2.5 | 25 | 6.9 |
|  | 3.2 | 29 | 6.9 |
|  | 4.8 | 30 | 6.8 |
|  | 6.4 | 39 | 6.7 |
| Ferric chloride | 3.3 | 14 | 6.6 |
|  | 5.4 | 25 | 5.9 |
|  | 6.5 | 31 | 3.9 |
|  | 7.6 | 26 | 3.8 |
|  | 10.9 | 16 | 2.2 |

The above figures illustrate the increased effectiveness of aluminium chlorohydrate as a conditioning agent as compared with ferric chloride.

Example 9

The test was carried out on activated sludge having a solids content of 2.7% using filter paper No. 1, a pressure differential of 27" of mercury and a filter bed area of 38.6 sq. cms. Certain of the samples were elutriated with water before testing and the tests were carried out on sludge samples of various ages. The results are as follows:

| Age of Sludge in hours | Agent | No. of 1:1 Elutions | Percent $R_2O_3$ on Dry Matter | Filtration Rate, W | Filtrate, pH |
|---|---|---|---|---|---|
| 36 | Aluminium Chlorohydrate, 65% basic. | 0 | 0 | 3.1 | 7.1 |
| | | | 0.6 | 6.7 | 6.9 |
| | | | 1.0 | 11 | 6.8 |
| | | | 1.3 | 15 | 6.6 |
| | | | 1.9 | 24 | 6.5 |
| | | | 3.8 | 26 | 6.4 |
| | | | 5.8 | 37 | 6.2 |
| | | | 9.6 | 93 | 6.0 |
| 36 | Chlorinated Copperas. | 0 | 1.9 | 9 | 5.6 |
| | | | 3.8 | 18 | 5.2 |
| | | | 5.8 | 38 | 5.0 |
| | | | 9.6 | 88 | 4.2 |
| 54 | Aluminium Chlorohydrate, 65% Basic. | 0 | 0 | 2.4 | 7.2 |
| | | | 0.9 | 9.8 | 6.8 |
| | | | 1.8 | 13 | 6.8 |
| | | | 3.7 | 33 | 6.5 |
| | | | 9.1 | 104 | 6.5 |
| 148 | do | 0 | 0 | 1.5 | 7.2 |
| | | | 0.9 | 6.1 | 6.9 |
| | | | 1.8 | 16 | 6.7 |
| | | | 3.7 | 19 | 6.5 |
| | | | 9.2 | 89 | 6.0 |
| 54 | do | 1 | 0 | 1.9 | 7.3 |
| | | | 0.7 | 30 | 6.8 |
| | | | 1.5 | 39 | 6.7 |
| | | | 2.8 | 71 | 6.4 |
| | | | 7.0 | 105 | 6.1 |
| 78 | do | 2 | 0 | 2.8 | |
| | | | 0.6 | 27 | |
| | | | 1.3 | 66 | |
| | | | 2.5 | 108 | |
| | | | 6.3 | 173 | |
| 102 | do | 3 | 0 | 2.5 | |
| | | | 0.3 | 18 | |
| | | | 0.8 | 30 | |
| | | | 1.6 | 46 | |
| | | | 7.8 | 122 | |
| 148 | do | 4 | 0 | 2.2 | 6.9 |
| | | | 0.8 | 26 | 6.4 |
| | | | 1.5 | 58 | 6.3 |
| | | | 2.1 | 80 | 6.3 |
| | | | 7.7 | 105 | 6.0 |
| 172 | do | 5 | 0 | 2.9 | 6.9 |
| | | | 0.16 | 12 | 6.8 |
| | | | 0.3 | 21 | 6.8 |
| | | | 0.8 | 19 | 6.8 |
| | | | 1.6 | 42 | 6.5 |
| | | | 3.2 | 133 | 6.3 |
| | | | 8.1 | 199 | 6.0 |

Even though activated sludge is an unstable biological system, the above figures show that in cases where it must be kept for considerable periods, efficient filtration is still possible after conditioning with aluminium chlorohydrate of 65% basicity.

*Example 10*

The test was carried out on activated sludge having a solids content of 1.3% using filter paper No. 1, a pressure differential of 20" of mercury and a filter area of 63.6 sq. cms. To parallel those instances in commercial practice where the activated sludge is not kept for any length of time, filtration was carried out for a period of 2 minutes instead of to filter pad failure as in the preceding examples. The results are as follows:

| Agent | Percent $R_2O_3$ on Dry Matter | Filtration Rate, V | Filtrate, pH |
|---|---|---|---|
| Aluminium Chlorohydrate, 61.7% basic. | 0 | 0.45 | 6.6 |
| | 0.7 | 0.7 | 6.6 |
| | 3.5 | 0.8 | 6.0 |
| | 5.5 | 1.2 | 5.6 |
| | 8.3 | 1.6 | 5.2 |
| | 12 | 1.6 | 4.6 |
| | 20 | 1.6 | 4.5 |
| | 35 | 1.7 | 4.5 |
| | 69 | 1.4 | 4.4 |
| | 139 | 0.9 | 4.4 |
| Ferric chloride | 0 | 0.4 | 6.3 |
| | 2.7 | 0.9 | 5.8 |
| | 5.4 | 1.4 | 5.4 |
| | 8.1 | 1.4 | 4.2 |
| | 11 | 1.4 | 3.8 |
| | 16 | 1.2 | 3.6 |
| | 22 | 0.9 | 3.6 |
| | 27 | 0.8 | 3.6 |

The above figures show the enormous range in the amount of chlorohydrate which will still result in a high rate of filtration. The range is much smaller in the case of ferric chloride, the maximum attained is not so high and the filtrate pH value falls to lower values with increasing excess of coagulant.

*Example 11*

The test was carried out on humus sludge having a solids content of 4.7% using filter paper No. 1, a filter bed area of 95 sq. cms. and a pressure differential of 20" of mercury. The results were as follows:

| Agent | Percent $R_2O_3$ on Solid Matter | Filtration Rate, W | Filtrate, pH |
|---|---|---|---|
| Aluminium Chlorohydrate, 66.5% basic. | 2.1 | 5.3 | 6.2 |
| | 3.2 | 5.7 | 6.2 |
| | 4.2 | 8.4 | 6.1 |
| | 5.3 | 9.7 | 6.1 |
| | 6.3 | 9.0 | 6.0 |
| | 8.5 | 8.0 | 5.8 |
| Lime | 1.1 | 0.7 | |
| | 11.0 | 0.7 | |
| | 57 | 2.2 | |
| Chlorinated Copperas, $FeClSO_4$ | 2.4 | 0.7 | |
| | 4.7 | 0.7 | |
| | 7.0 | 1.2 | |
| | 12 | 2.4 | 3.5 |
| | 17 | 2.0 | 3.0 |

The filtration rate in the case of the chlorohydrate is a marked improvement over that attainable with widely varied quantities of lime or chlorinated copperas.

*Example 12*

The test was carried out on humus sludge under 30 hours old and having a solids content of 4.32% using filter paper No. 1, a filter bed area of 95 sq. cms. and a pressure differential of 20" of mercury. The results were as follows:

| Agent | Percent $R_2O_3$ on Dry Matter | Filtration Rate, W |
|---|---|---|
| Aluminium Chlorohydrate, 66.7% basic | 0 | 0.7 |
| | 1.0 | 4.4 |
| | 1.7 | 9.5 |
| | 2.1 | 16 |
| | 2.6 | 19 |
| | 3.0 | 23 |
| | 3.9 | 29 |
| | 4.3 | 27 |
| | 5.6 | 30 |
| | 6.0 | 36 |
| | 6.5 | 42 |
| | 8.6 | 26 |
| | 10.7 | 22 |
| Ferric Chloride | 3.4 | 4.8 |
| | 5.8 | 17 |
| | 6.5 | 22 |
| | 8.6 | 21 |

The above figures indicate the advantages of the aluminium chlorohydrate as regards non-critical range of the dosage employed. Moreover, to produce a filtration rate greater than 10, the dosage of ferric chloride is by far the larger.

*Example 13*

The test was carried out on mixed mesophilic digested primary sludge (4 volumes) and activated sludge (3 volumes) using filter paper Whatman No. 4, a filter bed area of 38.6 sq. cms. and a pressure differential of 27" of mercury. One elutriation was performed on the sludge, prior to carrying out the test, using 1 volume of sludge to 2.5 volumes of water. The elutriated sludge had a solids content of 7.5%. The figures below are for a sludge 72 hours old.

| Agent | Percent R₂O₃ on Dry Matter | Filtration Rate, W | Filtration Rate, V |
|---|---|---|---|
| Aluminium chloride | 0<br>0.13<br>0.25<br>0.38<br>0.63<br>1.3 | 2.5<br>4.2<br>18<br>17<br>47<br>47 | 0.03<br>0.06<br>0.14<br>0.23<br>0.62<br>0.60 |
| Ferric chloride | 0.29<br>0.44<br>0.73<br>1.47 | 3.4<br>11<br>34<br>100 | 0.05<br>0.15<br>0.42<br>1.2 |
| Aluminium Chlorohydrate, 80% basic. | 0.13<br>0.19<br>0.25<br>0.38<br>0.63<br>1.3 | 4.6<br>6.1<br>13.2<br>22<br>61<br>149 | 0.07<br>0.08<br>0.19<br>0.30<br>0.82<br>1.8 |

The advantages of the chlorohydrate will be seen to extend to mixed sludges as well as applying to individual sludges.

*Example 14*

The test was carried out on a mixed raw primary and humus sludge with a solids content of 6.5% using a filter paper No. 1, a filter bed area of 19.6 sq. cms., and a pressure differential of 29" of mercury. The conditioning agent was aluminium chlorohydrate 65% basic. The results were as follows:

| Sludge Age in hours | Percent R₂O₃ on Dry Matter | Filtration Rate, W |
|---|---|---|
| 48 | 0<br>0.35<br>0.54<br>0.70<br>0.88<br>5.4 | 3.0<br>19<br>24<br>29<br>64<br>114 |
| 144 | 0.35<br>0.54<br>0.70<br>0.88<br>3.5 | 8.2<br>8.8<br>15<br>33<br>127 |

The above figures indicate that in the case of mixed sludges also, variation in sludge age does not adversely effect the filtration rate.

We claim:

1. In the process for treating sewage after it has entered the sewage works, screened, filtered, acted upon by bacterial flora and the finely divided matter remaining is in the form of a sludge, the improvement which consists of conditioning the sludge by mixing it with a solution of a basic chloride of a trivalent metal selected from the group consisting of $R_2Cl_2(OH)_4$ and $R_2Cl(OH)_5$ and mixtures thereof wherein R is a member selected from the group consisting of aluminum, iron and chromium, said solution containing cations of said metal and Cl and OH anions, the proportion of chlorine ions to total anions in the chloride being within the range of 17% to 40%.

2. The improvement as defined in claim 1 wherein said solution of a basic chloride of a trivalent metal is present in said mixture in an amount, calculated as $Al_2O_3$, of from 0.5% to 4.5% of the dry solids content of the sludge.

3. The improvement as defined in claim 1 wherein said basic chloride of a trivalent metal is $Al_2Cl(OH)_5$.

References Cited in the file of this patent

UNITED STATES PATENTS

| | | |
|---|---|---|
| 1,747,175 | Mahler | Feb. 18, 1930 |
| 1,847,080 | Buswell | Mar. 1, 1932 |
| 2,015,375 | Bomonti | Sept. 24, 1935 |
| 2,056,887 | Pecker | Oct. 6, 1936 |
| 2,059,110 | Ioannu | Oct. 27, 1936 |
| 2,196,016 | Huehn et al. | Apr. 2, 1940 |
| 2,264,790 | Coleman | Dec. 2, 1941 |
| 2,312,198 | Slagle | Feb. 23, 1943 |
| 2,686,171 | Crouch | Aug. 10, 1954 |